United States Patent
Weiter et al.

(10) Patent No.: US 8,398,149 B2
(45) Date of Patent: Mar. 19, 2013

(54) DOOR OF A MOTOR VEHICLE

(75) Inventors: Peter Weiter, Borg (DE); Michael Braun, Schwalbach (DE)

(73) Assignee: ThyssenKrupp System Engineering GmbH, Heilbronn (DE)

( * ) Notice: Subject to any disclaimer, the term of this patent is extended or adjusted under 35 U.S.C. 154(b) by 356 days.

(21) Appl. No.: 12/667,126

(22) PCT Filed: Jul. 8, 2008

(86) PCT No.: PCT/EP2008/058840
§ 371 (c)(1),
(2), (4) Date: Dec. 29, 2009

(87) PCT Pub. No.: WO2009/007364
PCT Pub. Date: Jan. 15, 2009

(65) Prior Publication Data
US 2010/0199561 A1    Aug. 12, 2010

(30) Foreign Application Priority Data

Jul. 9, 2007  (DE) .......................... 10 2007 032 143
Sep. 25, 2007  (DE) .......................... 10 2007 045 976

(51) Int. Cl.
*B60J 5/04* (2006.01)

(52) U.S. Cl. .................................................. 296/146.6

(58) Field of Classification Search .............. 296/146.1, 296/146.5, 146.6; 49/70
See application file for complete search history.

(56) References Cited

U.S. PATENT DOCUMENTS

| | | | | |
|---|---|---|---|---|
| 4,306,381 A * | 12/1981 | Presto | | 49/502 |
| 5,536,060 A * | 7/1996 | Rashid et al. | | 296/146.6 |
| 5,787,645 A * | 8/1998 | Heim et al. | | 49/502 |
| 5,787,646 A * | 8/1998 | Nakamori | | 49/502 |
| 5,857,732 A * | 1/1999 | Ritchie | | 296/146.5 |
| 5,924,760 A * | 7/1999 | Krajewski et al. | | 296/146.6 |
| 6,139,088 A * | 10/2000 | Okamoto et al. | | 296/146.6 |
| 6,328,359 B1 * | 12/2001 | Pacella et al. | | 293/128 |
| 6,381,906 B1 * | 5/2002 | Pacella et al. | | 49/502 |
| 6,383,662 B1 * | 5/2002 | Frommeyer | | 428/653 |
| 6,474,721 B2 * | 11/2002 | Nishikawa et al. | | 296/146.6 |
| 7,124,541 B2 * | 10/2006 | Fellner | | 49/502 |

(Continued)

FOREIGN PATENT DOCUMENTS

| | | |
|---|---|---|
| DE | 60101917 | 2/2005 |
| DE | 102005005684 | 8/2006 |

(Continued)

*Primary Examiner* — H Gutman
(74) *Attorney, Agent, or Firm* — McGlew and Tuttle, P.C.

(57) ABSTRACT

The invention relates to a door of a motor vehicle having an outer panel (1), an inner panel (2), a plate-shaped member (6), which is arranged on the door inside, for various add-on and mounting units, and reinforcement regions (14 to 17) for door functional elements and an installed stiffening member (3, 4) as a side-impact protector. In order to optimize the ratio of stiffness to side-impact protection of the door and to optimize the production expenditure of the door, the inner panel (2) and the stiffening member (3, 4) are formed as an integral frame-shaped component (5) which includes the reinforcement regions (14 to 17) from high-strength to superhigh strength steel sheet, and that are hot-worked. In order to be able to install the add-on and mounting units with sufficient mounting length, the plate-shaped member (6) is fastened to the inner panel (2) by means of a holding frame (7) which provides the desired mounting depth.

2 Claims, 5 Drawing Sheets

U.S. PATENT DOCUMENTS

| | | | |
|---|---|---|---|
| 7,125,067 B2 * | 10/2006 | Bonnett et al. | 296/146.6 |
| 7,300,097 B2 * | 11/2007 | Nakagawa | 296/146.6 |
| 7,607,716 B2 * | 10/2009 | Buchta et al. | 296/146.6 |
| 7,766,414 B2 * | 8/2010 | Krajewski et al. | 296/146.6 |
| 2001/0017476 A1 * | 8/2001 | Nishikawa et al. | 296/146.6 |
| 2004/0012226 A1 * | 1/2004 | Morrison et al. | 296/146.5 |
| 2005/0093334 A1 * | 5/2005 | Koa et al. | 296/146.5 |
| 2006/0290166 A1 * | 12/2006 | Gehringhoff et al. | 296/146.6 |
| 2007/0039245 A1 * | 2/2007 | Buchta et al. | 49/502 |
| 2010/0052360 A1 * | 3/2010 | Hsu et al. | 296/146.6 |

FOREIGN PATENT DOCUMENTS

| | | |
|---|---|---|
| DE | 102005009179 | 9/2006 |
| DE | 102005030507 | 1/2007 |
| EP | 1 142 727 | 10/2001 |
| EP | 1 803 596 | 7/2007 |
| WO | WO 2004/108481 | 12/2004 |

* cited by examiner

DOOR OF A MOTOR VEHICLE

CROSS REFERENCE TO RELATED APPLICATIONS

This application is a United States National Phase application of International Application PCT/EP2008/058840 and claims the benefit of priority under 35 U.S.C. §119 of German Patent Applications DE 10 2007 032 143.2 filed Jul. 9, 2007 and DE 10 2007 045 976.0 filed Sep. 25, 2007, the entire contents of each are incorporated herein by reference.

FIELD OF THE INVENTION

The present invention relates to a door of a motor vehicle, the said door comprised of an outer panel, an inner panel, a plate-shaped beam member arranged on the door inside for various add-on and mounting units as well as reinforcement regions for door functional elements and an installed stiffening member as a side-impact protector.

BACKGROUND OF THE INVENTION

Doors of this type or of a similar type are known in various designs. Such doors must provide good protection to vehicle occupants in the event of a side impact. Moreover, they must offer the possibility to accommodate various aggregates such as window lift mechanical equipment, loudspeakers and the like.

With a door of the initially mentioned type known from applications in practice, the deep-drawn inner panel comprises the beam member for various add-on and mounting units. To obtain sufficient mounting depth for these aggregates, the inner panel must be made of good deep-drawn steel. However, such steel contributes little to stiffening of the door. Therefore, an autonomous stiffening beam made of high-strength steel sheet is mounted to the door inner panel to serve as side impact protection. Moreover, profiled elements made of high-strength steel are mounted in the reinforcement regions for the door functional elements such as hinges and lock. Owing to the multitude of individual elements to be assembled, the expenditure on fabricating such a door is high. Its ratio between stiffness and weight is not optimal either.

With another door of a motor vehicle which is known from the relevant patent literature (DE 10 2005 009 179 AI), the stiffening beam serving as side impact protection is mounted at the outer panel of the door. The plate-shaped beam member for the various add-on and mounting units is made of plastic material and formed as a hybrid component with a metallic frame. The metallic frame furnishes this hybrid component with the mounting depth required for the add-on and mounting units and it comprises the reinforcement regions for the door functional elements. This hybrid component is preferably firmly connected by a bolted union to the door outer panel and is designed to render a substantial contribution to door stiffness.

With another door of a motor vehicle which is also known from the relevant patent literature (DE 10 2005 030 507 AI), a frame-shaped reinforcing element together with the outer panel and inner panel forms a door structure. For this purpose, this element is firmly connected by joined connections such as spot welding to the outer and inner panel. The reinforcing element is made of high-strength steel and can be fabricated by hot working The reinforcing areas for hinges and for the lock are integrally configured at it. A stiffening beam serving as side impact protection extends diagonally through the frame and is an integral part of the frame. In addition to this reinforcing element arranged between the outer and inner panel, a beam for various add-on and mounting aggregates can be installed into the door. However, prior art technology does not disclose how such a beam is configured.

Finally, the relevant patent literature (DE 10 2005 005 684 AI) discloses a frame-shaped reinforcing element which is very similar to the reinforcing element of the door described hereinabove and which is also made of high-strength steel sheet and fabricated by hot working. As integral components, this reinforcing element also has reinforcing regions for the door lock and door hinges as well as a stiffening beam serving as side impact protection and extending diagonally through the frame. Such a reinforcing element is arranged between the outer panel and the inner panel of the motor vehicle door. Prior art technology available in this regard does not address the accommodation of add-on and mounting aggregates.

SUMMARY OF THE INVENTION

Now, therefore, it is the object of the present invention to create a door for a motor vehicle that has a high inherent stiffness with side impact protection and in which add-on as well as mounting aggregates can be accommodated whilst calling for little expenditure on fabrication.

According to the present invention, this task is solved with a door of the initially mentioned type in that the inner panel and the stiffening beam member are configured as an integral, frame-shaped component comprising the stiffening regions, made of high-strength to super-high strength steel sheet, and are hot worked, and in that the beam member for the add-on and mounting aggregates is fastened via a holding frame to the inner panel.

The inventive door can be fabricated with comparably little expenditure because the inner panel and the stiffening beam member serving for side impact protection are configured in one piece, i.e. as an integral component made of high-strength to superhigh strength steel sheet. Owing to hot working, the desired profile depth of the component can also be achieved. It means this integral component of the door does not only furnish the door with the desired inherent stiffness but also with the desired protection in the event of a side impact. Moreover, as high strength to super-high strength steel sheets are used, even door hinges and the like can be mounted directly or indirectly to this steel sheet. Separate reinforcing elements for door hinges or the like are not required.

The desired remodelling degree of the high strength to super-high strength steel sheet can be achieved in one step or two. With a single-stage remodelling process, the steel sheet is warmed up to austenitizing temperature, hot worked and hardened, more particularly press-hardened. With a twin-stage process, cold remodelling is accomplished at first, with it being advisable to exploit the maximally possible remodelling degree, and then, after reheating to austenitizing temperature, a hot remodelling is accomplished, possibly with a final hardening, more particularly a press hardening. Corresponding to the different strains and stresses in various regions of the component to be expected in operation later-on, different hardening zones can be adjusted in the component by applying different heat treatments in various regions. Thus, the inner panel may have partly different strengths and elongation at rupture in highly stressed regions, more particularly in regions for door functional elements, versus the other regions of the component. By using a beam member supported by a holding frame, it can be configured to merely suit the requirements for the add-on and mounting aggregates while disregarding the important requirements exacted from a door with regard to stiffness and side impact protection.

According to a first advantageous embodiment of the present invention, it is provided for that the holding frame, too, is made of high strength to super-high strength steel sheet and is hot worked. By using high strength to super-high strength steel sheet in case of the holding frame, too, one can dispense with the reinforcing sheet usually to be provided in the area of the window shaft because the necessary stiffness is already afforded by the holding frame itself. Furthermore, the reinforcing regions provided for the door functional elements, for example door lock and door hinges can also be provided for at the holding frame itself due to its high strength. Likewise, the reinforcing regions can be provided both at the inner panel and at the holding frame made of high strength to super-high strength steel sheet, thus leading to an increase in overall strength.

If a window frame at the door is provided for, then it can finally be configured either as an integral pat of the inner panel or as an integral part of holding frame fabricated from high-strength to super-high strength steel sheet.

By the use of high strength to super-high strength steel sheet for the holding frame, too, on the whole it thus results a heightened constructive freedom in door development.

According to another embodiment of the present invention, the beam member for the add-on and mounting aggregates as well as the holding frame can be configured as a one-piece component.

The beam member and/or the holding frame can be made of steel sheet, plastic or of a hybrid structure (metal/plastic). Since the mounting depth for the aggregates is realized virtually alone by the holding frame, this holding frame can be composed of soft deep-drawn steel, aluminum, plastic or of a hybrid structure. However, preference is given to the use of high strength to super-high strength steel sheet for a one-piece configuration of the beam member and holding frame. On account of its strength, the beam member in this case acts like an additional integrated side impact protection so that vehicle occupant protection in the event of a side crash is ensured both by the stiffening beam member integrated in the inner panel and by the beam member.

The fastening between the inner panel and the holding frame can be a spot weld and/or a bolted and/or riveted and/or laser welded and/or glued connection.

The present invention will become more fully understood from a detailed drawing showing one exemplary embodiment. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
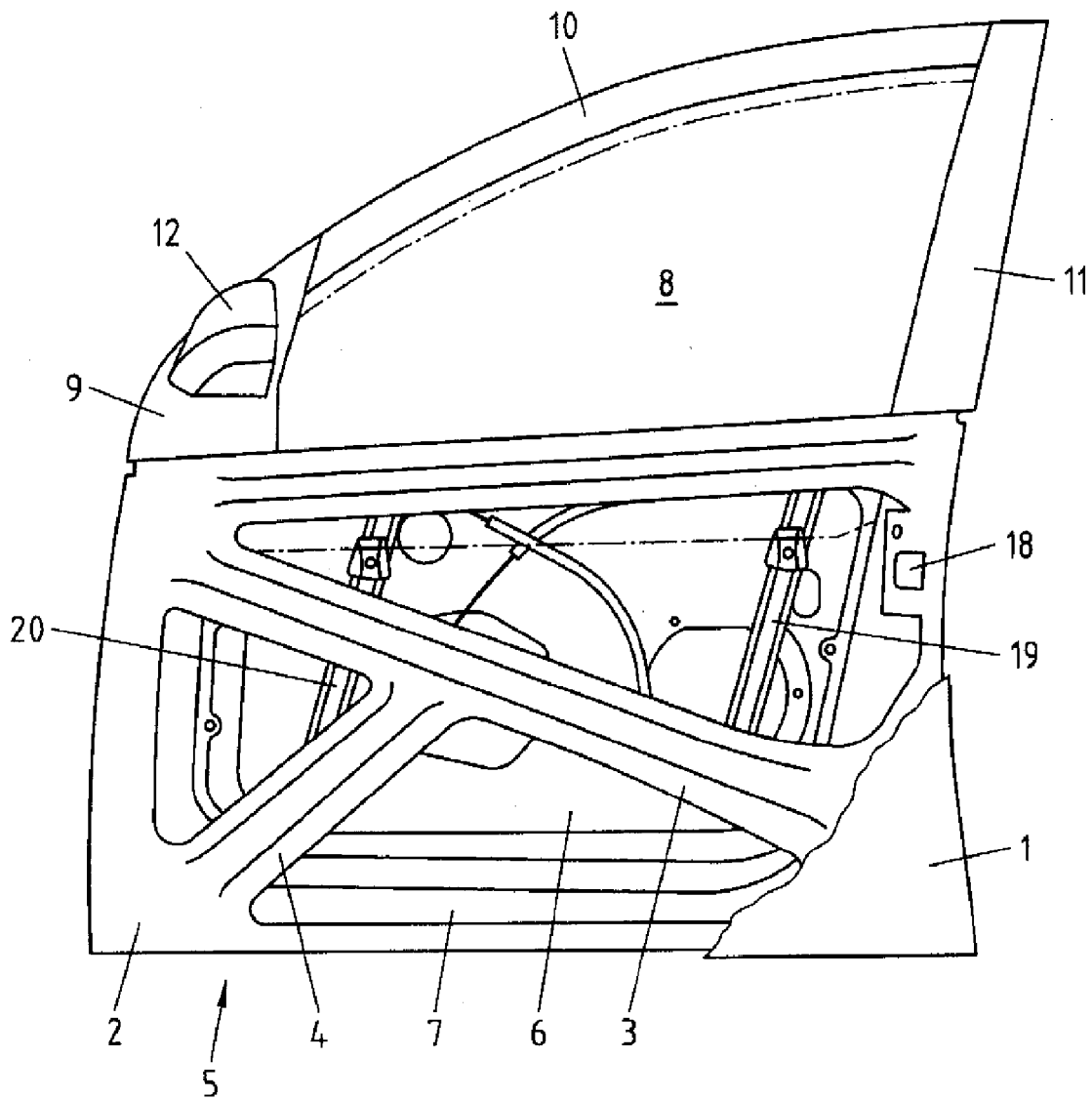
FIG. 1 is a lateral view from the outside showing a front-end side door on the left side of a motor vehicle with a predominantly broken-away outer panel.

Referring to the drawings in particular, the door of a motor vehicle as illustrated in FIG. 1 is comprised of an outer panel 1, a component 5 comprised of a frame-shaped inner panel 2 and a stiffening beam member 3, 4 extending diagonally and transversely to said inner panel, a beam member 6 for add-on and mounting aggregates as well as a frame 7 for the beam member 6. The frame of the inner panel 2 is clad with blind strips 9, 10, 11 in the region of the window aperture 8. In this region, the inner panel 2 also carries an exterior rear view mirror 12.

Figure 2:
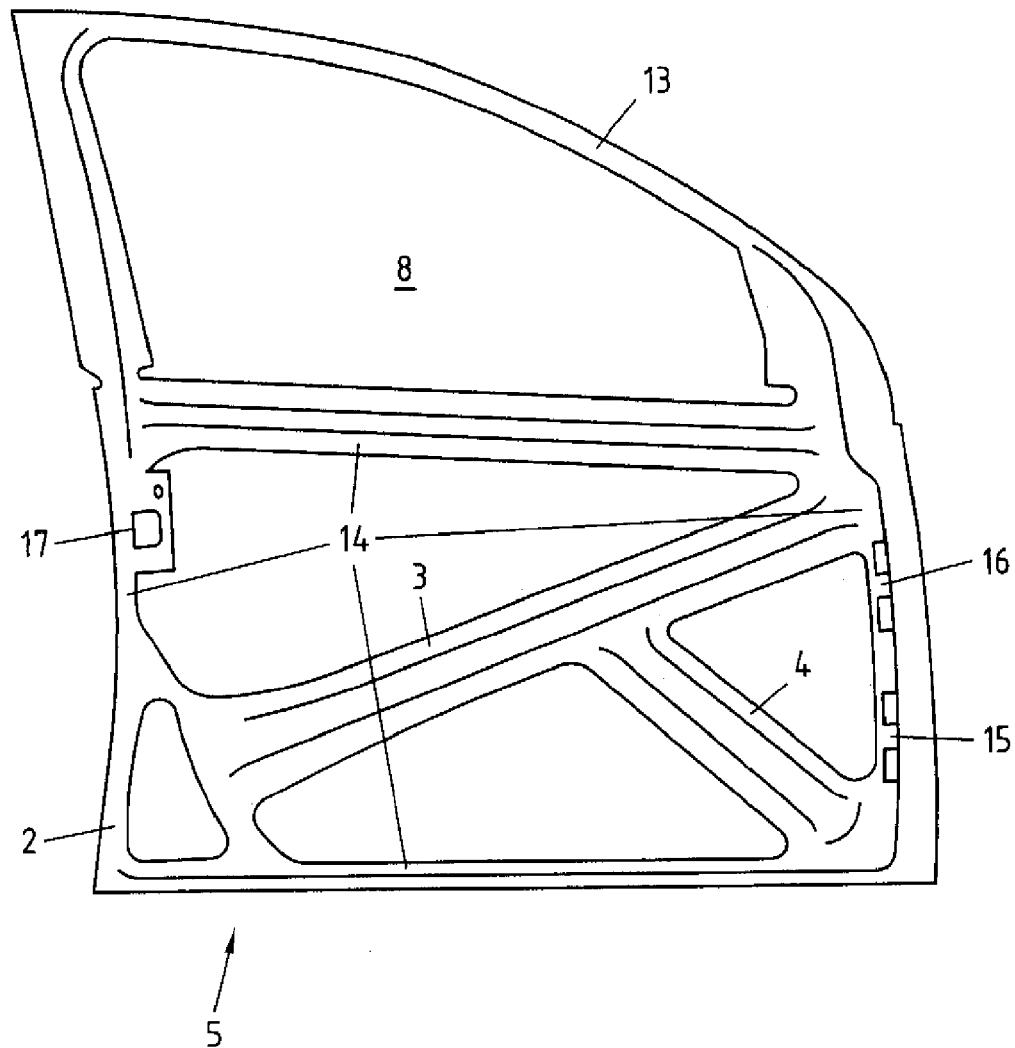
FIG. 2 is an inside lateral view showing an inner panel of the door according to FIG. 1.

The one-piece (integral) component 5 shown as an individual unit in FIG. 2 and composed of the inner panel 2 and stiffening beam member 3, 4 is shaped of high strength to super-high strength steel sheet, particularly 900 to 1800 N/mm$^2$. Shaping is accomplished by hot remodelling, more particularly at austenitizing temperature, with it being possible to precede hot remodelling by cold remodelling applying the greatest possible remodelling degree. Hardening (ageing), more particularly press-hardening, is performed subsequently. The term "press-hardening" shall be understood to be hardening by indirect cooling which is accomplished in closed moulding tools. Within the scope of hardening, different degrees of hardening can be adjusted and set in various regions. On account of the chosen steel sheet, and because of the profiled shaping achieved in hot remodelling followed by a hardening process, a component 5 is obtained that has high inherent stiffness and resistance to side impacts. In the upper region, the inner panel 2 has a window frame 13 and in the lower region, it has a frame 14 with the stiffening beam member 3, 4 extending diagonally and transversely and serving as side impact protection. In deviation from the exemplary embodiment illustrated here, the door and thus the inner panel 2 may also be configured without a window frame in an alternative configuration of the present invention. The advantages of the present invention are maintained.

Figure 3:
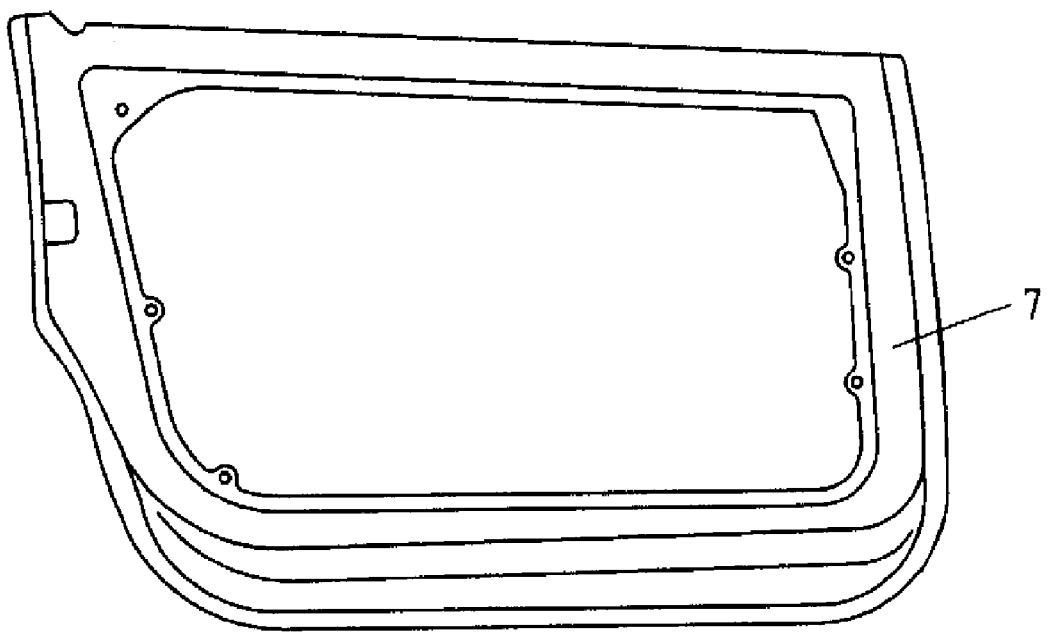
FIG. 3 is an inside lateral view showing a holding frame for a beam member for add-on and mounting aggregates of the door according to FIG. 1.
Figure 4:
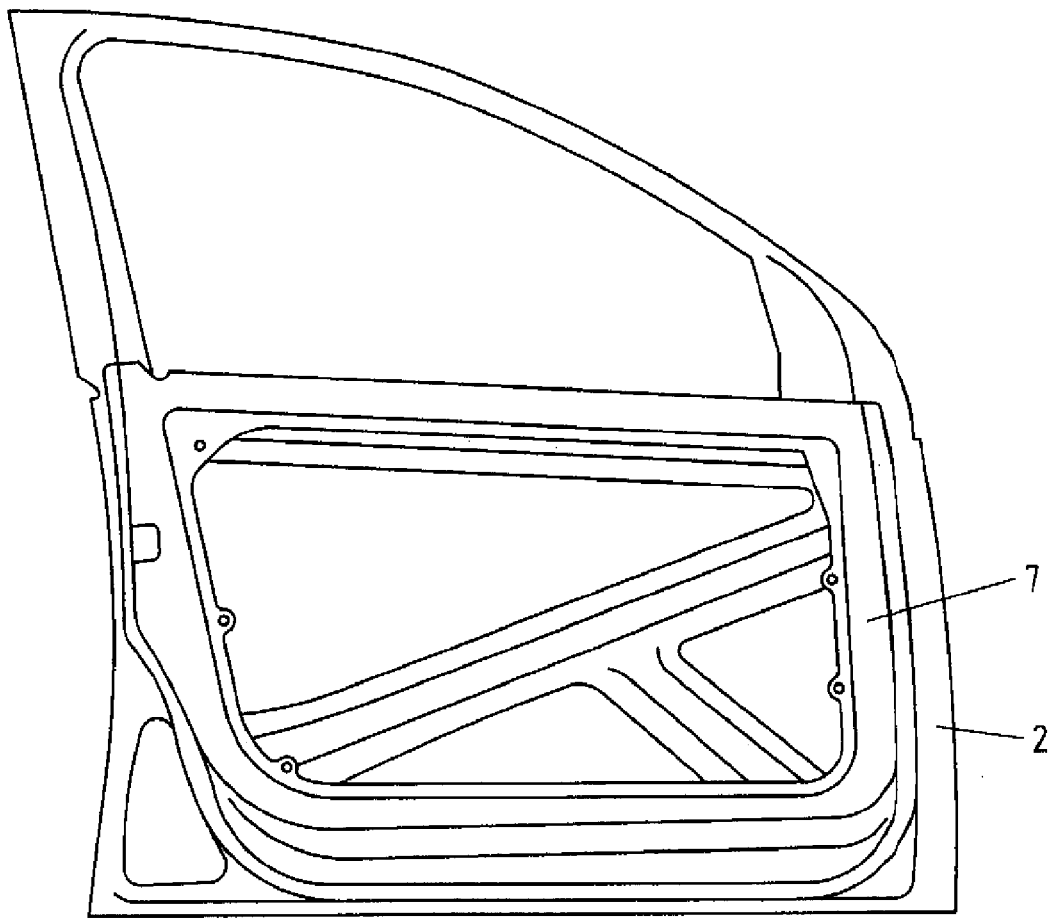
FIG. 4 is an inside lateral view showing the inner panel of FIG. 2 with added-on holding frame according to FIG. 3.
Figure 5:
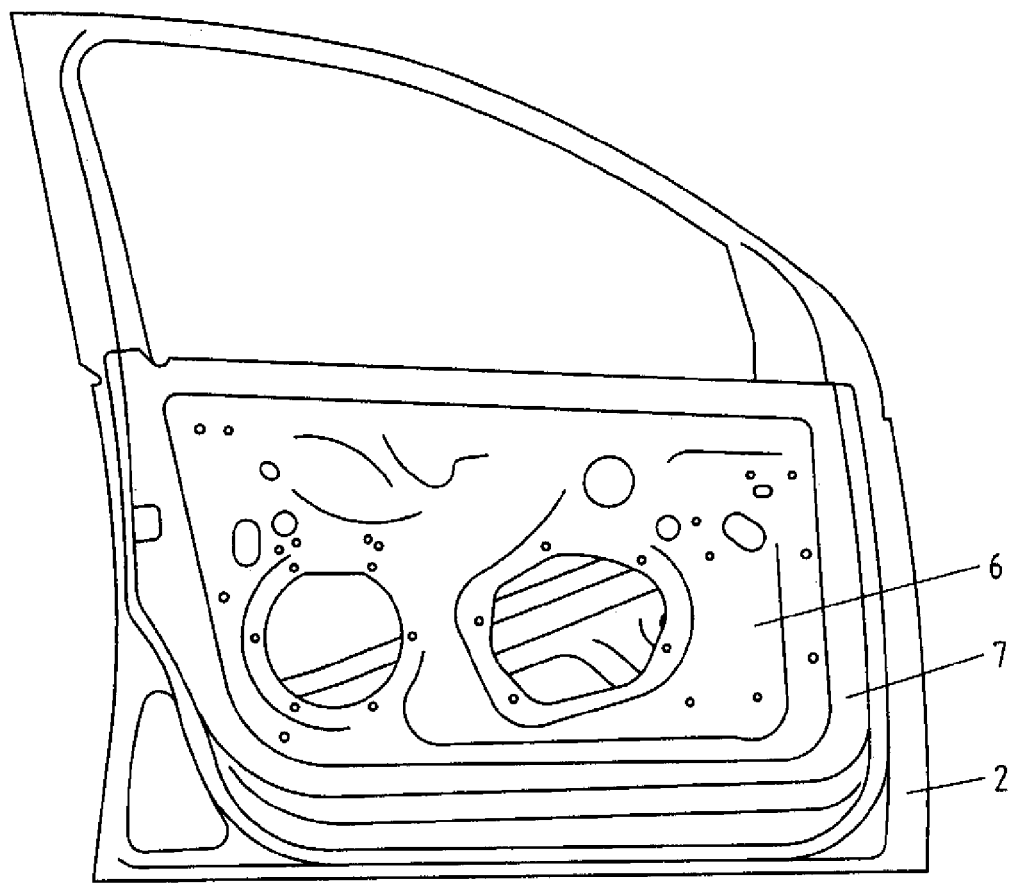
FIG. 5 is an inside lateral view showing the inner panel according to FIG. 2 with the holding frame and pertinent beam member for add-on and mounting units.

Reinforcing regions 15, 16 for door hinges in the front-end area and a reinforcing region 17 for a door lock in the rear area are configured at the inner panel 2 as integral components of said inner panel 2. The frame 7 (vide FIG. 3) particularly made of deep-drawn steel sheet or plastic or of a hybrid structure (metal/plastic) is fastened by way of spot welds and/or bolts and/or rivets and/or laser welding and/or gluing by adhesive to the lower area of the inner panel 2. The plate-shaped beam member 6 for various add-on and mounting aggregates is fastened, e.g. bolted, to it (vide FIG. 4). Various recesses for such aggregates and/or the aggregates themselves are indicatively shown in FIG. 1 and FIG. 5. Eligible as add-on and mounting aggregates re handling/operating elements 18 for a door lock, window lift, window lift drive, guide rails 19, 20 for the windows, loudspeakers, and the like. As the beam member 6 is of a plate-shaped configuration while the add-on and mounting aggregates partly require a substantial mounting depth, the holding frame 7 is built accordingly high and/or low, respectively. As an alternative to the two-piece construction composed of beam member 6 and open frame 7, both parts can also be configured in one-piece construction. They can be made of deep-drawn steel, aluminum, plastic or of a hybrid structure (metal/plastic).

While specific embodiments of the invention have been described in detail to illustrate the application of the principles of the invention, it will be understood that the invention may be embodied otherwise without departing from such principles.

The invention claimed is:

1. A door of a motor vehicle, the door comprising:
    an outer panel;
    an inner panel;
    a plate-shaped beam member, which is arranged on the door inside, for add-on and mounting units;
    a holding frame, said holding frame comprising soft deep-drawn steel, aluminum, plastic or a hybrid structure; reinforcement regions for door functional elements; and
    an installed stiffening member as a side-impact protector, the inner panel and the stiffening member being formed as an integral frame-shaped component which comprises the reinforcement regions and being made from a steel sheet, and being hot-worked and the beam member for add-on and mounting units being fastened to the inner panel by means of the holding frame.

2. A door as defined in claim 1, wherein said steel sheet has a strength of 900 to 1800 N/mm$^2$.